Dec. 12, 1967          D. W. MYERS            3,357,704
                    DUPLICATE BRIDGE BOARD
Filed Sept. 24, 1962                      3 Sheets-Sheet 1
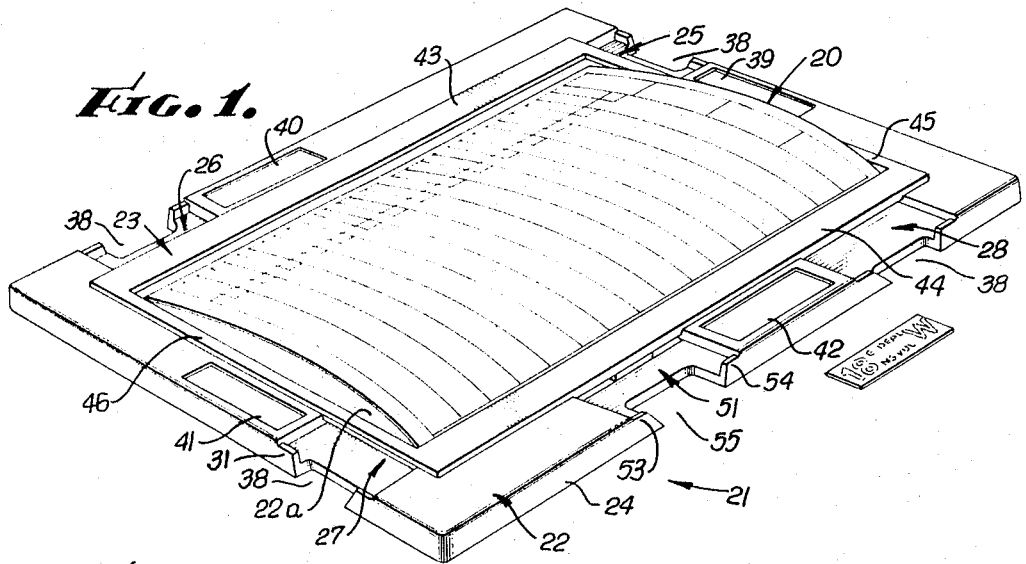
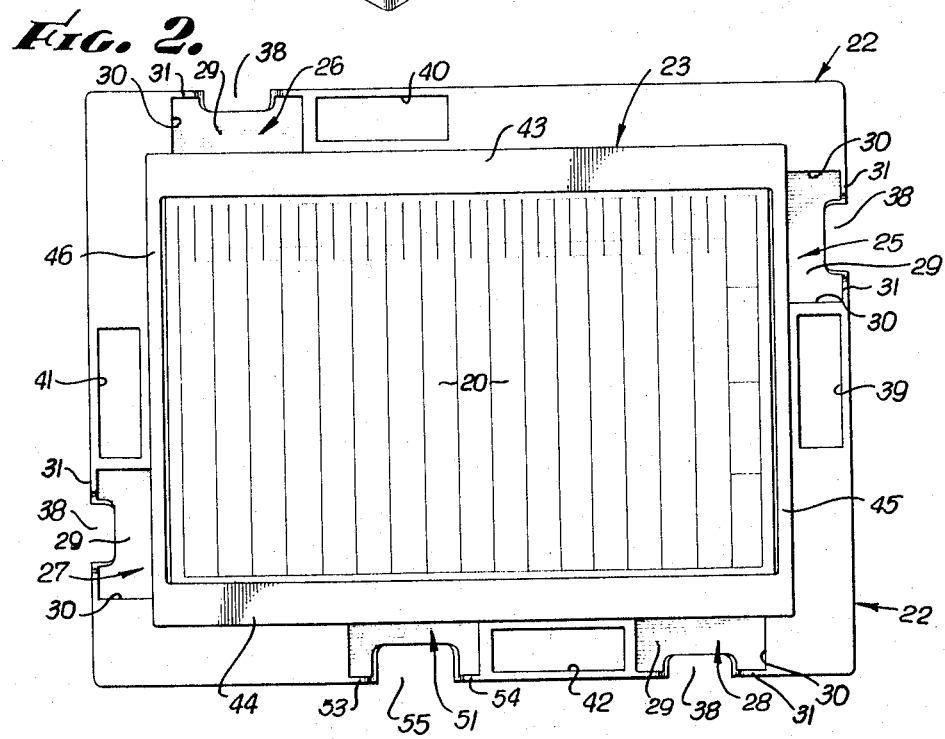
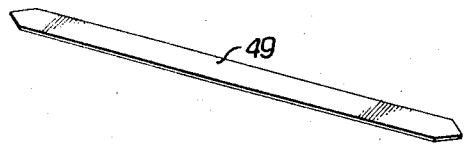

Dec. 12, 1967  D. W. MYERS  3,357,704
DUPLICATE BRIDGE BOARD
Filed Sept. 24, 1962  3 Sheets-Sheet 2
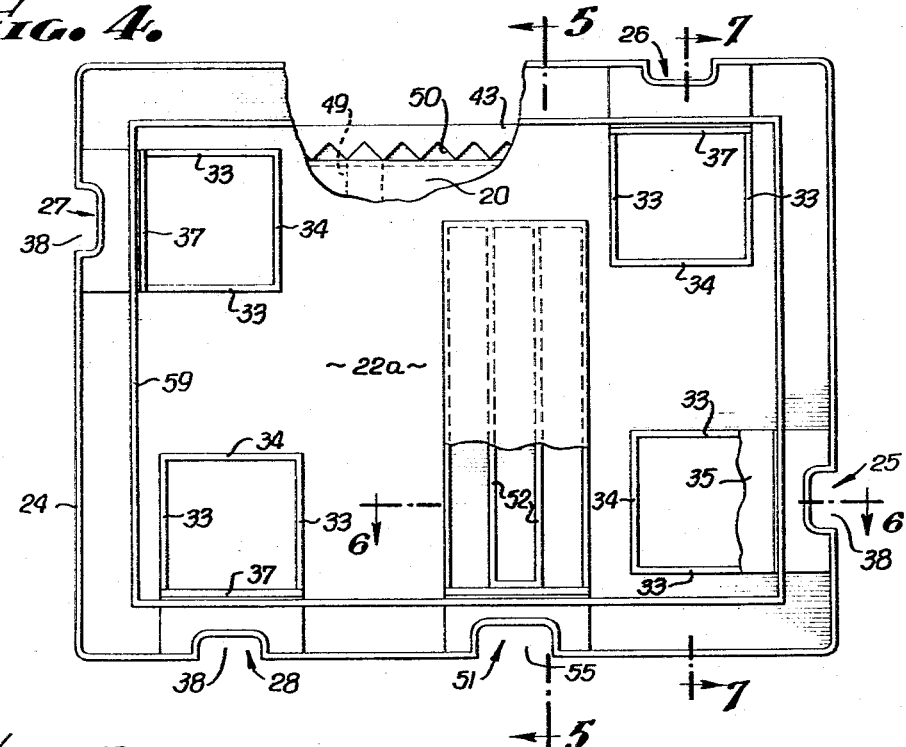
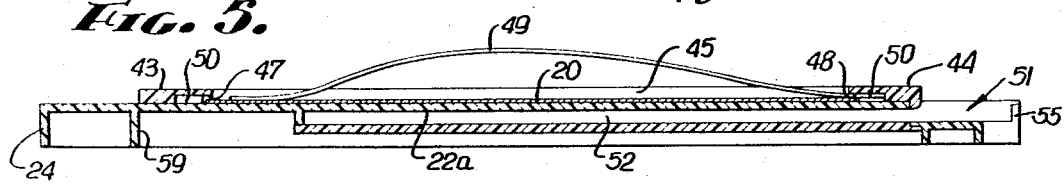
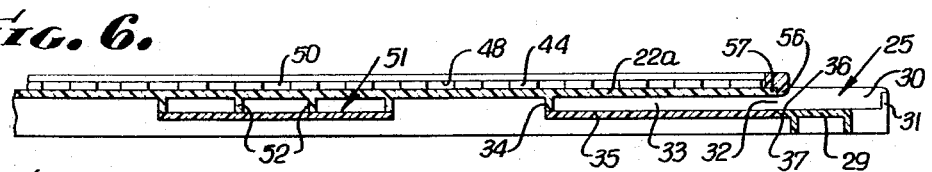
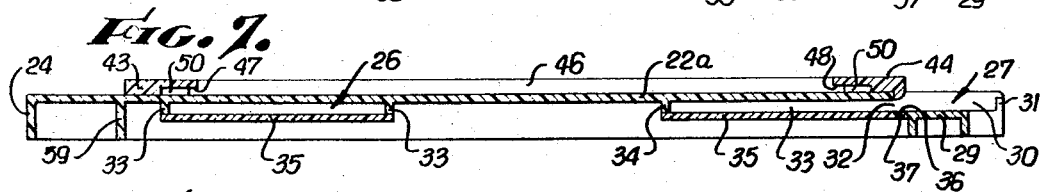
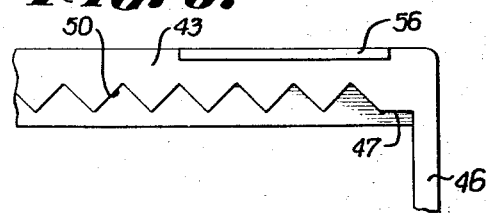
INVENTOR
DEAN W. MYERS
BY Flam and Flam
ATTORNEYS.

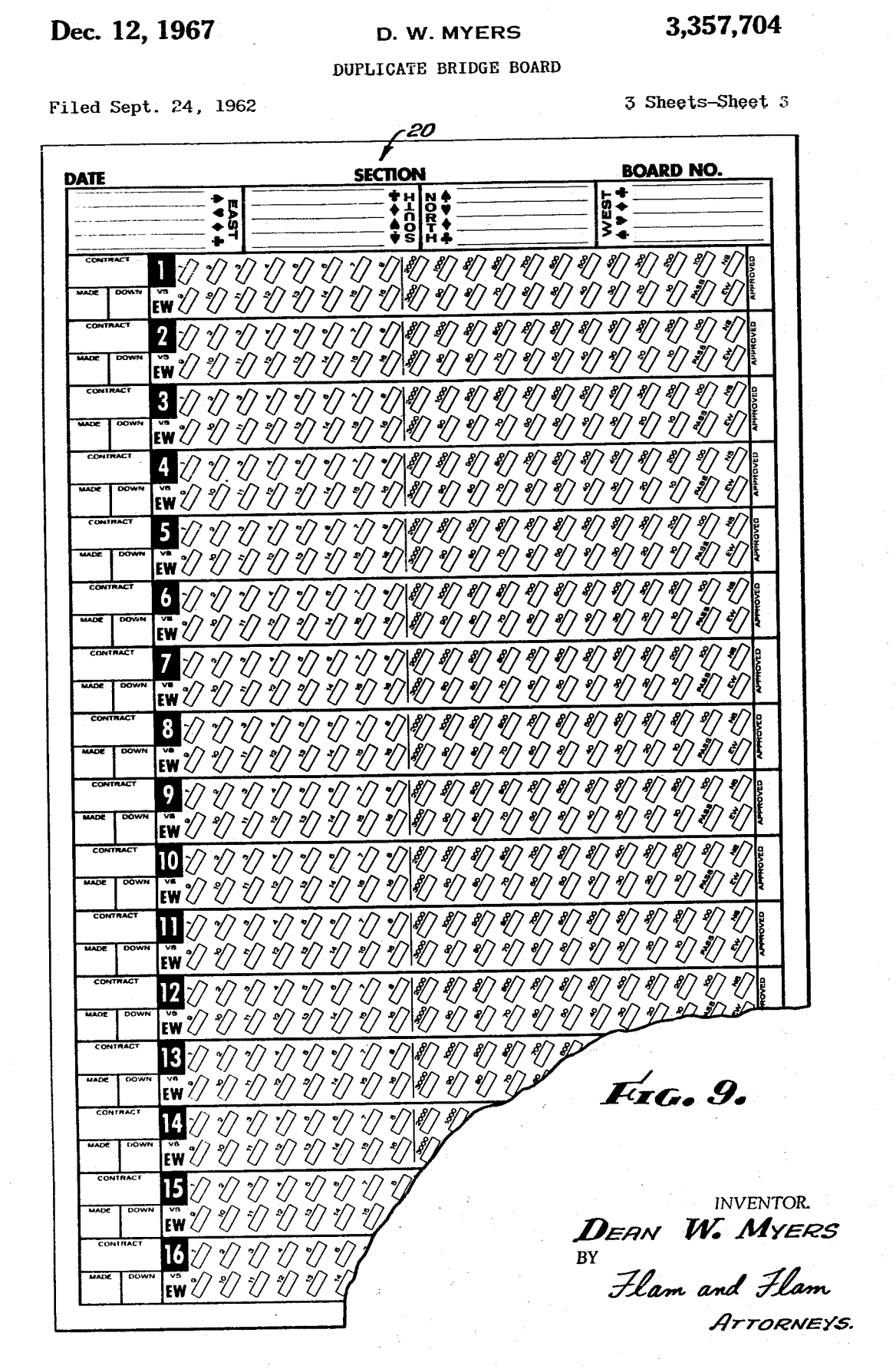

Dec. 12, 1967  D. W. MYERS  3,357,704
DUPLICATE BRIDGE BOARD
Filed Sept. 24, 1962  3 Sheets-Sheet 3

FIG. 9.

INVENTOR.
DEAN W. MYERS
BY
Flam and Flam
ATTORNEYS.

United States Patent Office 3,357,704
Patented Dec. 12, 1967

3,357,704
DUPLICATE BRIDGE BOARD
Dean W. Myers, Newport Beach, Calif., assignor to Frederick H. Flam, Tarzana, Calif.
Filed Sept. 24, 1962, Ser. No. 225,684
2 Claims. (Cl. 273—148)

This invention relates to duplicate bridge, and particularly to a duplicate bridge board of the type suggested in U.S. Letters Patent No. 3,044,693 issued July 17, 1962, to Frederick H. Flam, entitled, "Match Point Duplicate Bridge Scorer." In said prior patent, there is disclosed a duplicate bridge board having provisions for holding a data card on which all players enter their scores for that board. By so providing a data card, machine scoring is made practical.

In order to use such a combined duplicate board and data card holder, the scores must be concealed from the players next playing the board. Otherwise, no tournament could be run.

One object of this invention is to provide a simple duplicate board that, without moving parts, effectively holds a data card in place.

Another object of this invention is to provide simple foolproof means whereby the scores on the data card may be effectively concealed.

This invention possesses many other advantages, and has other objects which may be more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense, since the scope of this invention is best defined by the appended claims.

Referring to the drawings:

FIG. 1 is a pictorial view of a duplicate board incorporating the present invention;

FIG. 2 is a top plan view of one part of the duplicate board;

FIG. 3 is a pictorial view of a concealer member for use with the duplicate board;

FIG. 4 is a bottom plan view of the duplicate board, portions of the board being broken away;

FIGS. 5, 6 and 7 are enlarged sectional views taken along planes corresponding to lines 5—5, 6—6 and 7—7 of FIG. 4, FIG. 6 being a fragmentary view;

FIG. 8 is a fragmentary elevational view showing the under surface of a corner of the frame; and FIG. 9 is a fragmentary plan view of a data card for use with the duplicate board shown in FIGS. 1 to 8.

The data card 20 shown in FIG. 9 has, in this instance, a series of sixteen rectangular strips or lines bearing legends 1 to 16. The distance from the top edge of the card to the first strip is greater than the distance from the bottom edge of the card to the last strip. This asymmetry prevents improper placement of the card in a manner to be hereinafter described. The following explanations and instructions for marking are given:

The sixteen rectangles on the lefthand side of the strip are used to identify the EW team number. The twenty-four rectangles on the righthand side of the strip are used to indicate the score obtained. It is the duty of North to mark the data card. It is the duty of West to approve after vertification. A rectangle is marked by coloring it in completely, going back and forth over the same area a few times so that no white or light spots occur within the rectangle.

*Detailed instructions for North*

(1) Locate your line on the data card by the large numeral corresponding to your NS team number.
(2) After the auction is completed:
 (a) Print the contract and by whom played in the space provided. Use "X" for doubled, and "XX" for redoubled.
 (b) Mark the rectangle corresponding to the EW team number.
Note: If the hand is passed, first print "pass" under "contract" and mark the "pass" rectangle near the righthand side of the data card. Omit Step 3.
(3) After the hand is played:
 (a) Print the appropriate number under "made" or "down."
 (b) Mark the rectangles corresponding to the score.
 (c) Mark either the NS or EW rectangle depending, of course, upon which side scored.

A seventeenth rectanglar strip, equal in size to the other sixteen, is also provided at the top of the data card. This strip is used to provide a hand record for convenient duplication or preparation of the board. The strip is divided into four parts, as shown, for the hands of North, South, East and West. Guide lines and printing orientation make the hand record parts readable or accessible simultaneously by players seated at a bridge table.

A reading device (not shown) senses the existence of marks in the rectangles and transmits the corresponding information to a data processor whereby the scores are match pointed and the results tabulated.

The marking rectangles are about twice as high as they are wide. All of the rectangles are rotated slightly in a clockwise direction from a true vertical position in order to conform to the normal angularity of the writing of a righthanded person. By a very simple and normal manipulation, the rectangles can be blackened according to directions.

By virtue of the angularity of the rectangles, extensions of the markings in any one rectangle will miss the adjacent rectangles. Accordingly, there is no danger of accidentally marking an adjacent rectangle.

The data card 20 is inserted in a duplicate board 21 at the start of a bridge tournament session where it remains until the conclusion of the session. The duplicate board 21 comprises two main molded parts. One of the parts is a base or support 22 (FIG. 2), and the other of the parts (FIG. 1) is a frame element 23 fastened to the base part 22 for receiving the data card. The frame will be described more fully hereinafter.

The support shown in FIG. 2 is generally rectangular in form but longer and wider than the data card. The base part 22 has a central flat area 22a forming a backing for the data card 20, which is shown in the process of being inserted. The support 22 has a downwardly extending, interrupted peripheral flange 24, the lower edge of which is adapted to rest upon a card table or the marginal portion of the support of a similar duplicate board.

The support 22 provides four card pockets 25, 26, 27 and 28, each accommodating thirteen playing cards constituting a bridge hand corresponding, respectively, to South, East, North and West. These playing cards (not shown) are adapted to project beneath the flat area 22a upon which the data card 20 is supported and as shown in FIG. 6.

The outer portion of the card pocket 25, for example, is formed by a depressed or downwardly offset wall part 29 located beyond the area of the data card. This depressed wall part 29 is joined to the support by side walls 30 and front rails 31. The front rails 31 extend upwardly from truncated portions of the peripheral flange 24. An elongated opening or seat, as at 32 (FIG. 6) is formed at the offset between the area 22a and the depressed wall 29 between the side walls 30. A stack of thirteen cards can be inserted through this opening, the slot 32 corresponding in length to the minor dimension of a standard playing card, and corresponding in height to the thickness of thirteen such cards.

Side walls 33 (FIG. 4), formed as depending ribs on the support 22, form inward continuations of the side walls 30 at the outer end of the card pocket. A rib or end wall 34 joins the side walls or ribs 33 and forms the inward terminus of the card pocket.

The bottom wall of the card pocket 25 is formed by a separate cover plate 35 (FIG. 6) that is generally of rectangular form. The edges of the side walls 33 and the end wall 34 are engaged by the marginal portion of the cover 35. The inner surface of the cover plate 35 forms an inward continuation of the offset wall 29.

In order to provide an area of contact for the cover 35 at the edge of the wall 29, the under surface of the offset wall 29 at this edge and the end of the cover 35 are rabbeted, as at 36 and 37.

Thirteen playing cards are readily inserted into the card pocket 25 by flexing the cards to cause them to pass over the front rails 31. The front rails 31 desirably project above the plane of the top of the inner portion of the card pocket in order to prevent accidental removal of the cards.

The front rails 31 are separated by a thumb hole 38, as shown in FIG. 2, whereby the cards may be flexed upwardly and gripped for removal.

The card pockets 26, 27 and 28 are formed in the same manner as the card pocket 25. On the marginal portion of the support and adjacent each of the card pockets are shallow recesses 39, 40, 41 and 42 in which placards or tabs may be accommodated to indicate the player positions N, S, E and W and the conditions of play.

The frame element 23 for retaining the data card has side rails 43 and 44 and top and bottom rails 45 and 46. The frame is fastened to the top of the support about the central area 22a. Its peripheral edges slightly overlie the upward openings of the card pockets. The top and bottom rails 45 and 46 are spaced apart a distance corresponding to the major dimension of the data card. The side rails 43 and 44 are spaced apart a distance that is slightly less than the corresponding minor dimension of the data card 20. However, as shown clearly in FIGS. 5 and 8, the side rails 43 and 44 each have longitudinally extending recesses or slots 47 and 48. By flexing the data card 20 as shown in FIG. 1, the side edges of the data card may pass beneath the overhanging portions of the side rails 43 and 45 and into the recesses 47 and 48, whereby the data card is retained.

In order to conceal the scores after they are marked on the strips or marking areas, concealer members 49 (FIG. 3) are provided. These concealed members 49 are made of material such as fairly heavy gauge laminated vinyl or spring steel in order to provide suitable resilient characteristics for purposes presently to be described.

The width of the concealer member 49 corresponds to the width of the marking strip and the hand record strip over any of which it may be placed to conceal information. In order to retain the concealer members 49 in place and against shifting, their ends enter individual recesses 50 (see FIGS. 5 and 8) extending inwardly from the frame slot 49 and aligned with the strips. The concealer members must be flexed in order to enter the recesses, and as shown in FIG. 5. The recesses 50 will be aligned with the strips only if the card is inserted with the hand record strip to the right of the West position. Thus with the card inverted, the concealers will cover half of one strip and half of another, signalling improper card placement. This ensures against any improper composition of hands from the hand record.

The ends of the concealer members 49 are pointed or cut at 45° angles from opposite sides, and the recesses 50 are correspondingly formed to fit them. Other configurations could be provided. Once in place, the concealer members can be removed only by a deliberate manipulation. Accidental removal is made all the more difficult when several strips are placed in side-by-side relationship whereupon the lateral edges of the respective strips engage to restrain lateral flexure.

A fifth pocket 51 is provided for concealer members 49. The pocket 51 is generally similar to the pockets 25, 26, 27 and 28 except that it is longer to accommodate the length of the strip 49. Furthermore, the pocket 51 is divided into two parts by divider rails 52 and to conform to the width of the concealer members 49. End rails 53 and 54 prevent the concealer members from sliding out of their pockets and requiring that they be flexed upwardly for removal. To facilitate individual removal of the strips, a thumb hole 55 is provided that is slightly deeper than the thumb holes for the playing cards. Thus the strips can be engaged along their side edges.

In order to lend stability to the frame 23, bars, as at 56, are formed to fit over the edges 57 at the inner end of the upper card pocket openings and the upper opening of the opening for the concealer members. The flanges 56 furthermore hide from view the discontinuities formed at the offset openings, as at 32, so that a pleasing finished appearance is provided. Also, the corners of the flanges 56 are rounded, thereby guiding playing cards or concealer members into the pocket.

A depending rail 59 is formed in order to receive the frame 23 of a companion board, thereby accomplishing an interlocking or nesting relationship between them.

Companion applications of others disclose the same structure but claim different features thereof.

I claim:

1. In combination: a flexible data card having a series of discrete regions for placement by the teams of information corresponding to their scores; a duplicate bridge board having pockets for reception of playing cards, said board providing a frame for reception of the data card; said frame having edges forming an opening, the dimension between two opposite edges of the frame being less than the corresponding dimension of the data card; and means forming slots beneath said two edges for insertion and removal of the data card by flexure of said data card.

2. In combination: a flexible and resilient data card having a series of marking regions of equal size extending one above the other for placement by the teams of information corresponding to their scores; a duplicate bridge board having pockets for reception of playing cards, said board providing edges forming a frame in which the data card is fitted; means forming slots beneath the edges at the ends of the said regions; and a series of individual flexible concealer members having a width corresponding to the marking regions for overlying them, and ends adapted to be received respectively in said slots upon flexure of said concealer members for retention by said board over said marking regions.

References Cited

UNITED STATES PATENTS 3,236,523   2/1966   Stein _____ 273—151 X

DARYL W. COOK, *Acting Primary Examiner.*

MAYNARD R. WILBUR, *Examiner.*